United States Patent
Matsushita et al.

(10) Patent No.: US 10,915,100 B2
(45) Date of Patent: Feb. 9, 2021

(54) CONTROL SYSTEM FOR VEHICLE

(71) Applicant: TOYOTA JIDOSHA KABUSHIKI KAISHA, Toyota (JP)

(72) Inventors: Naoki Matsushita, Yamato (JP); Yuichi Kumai, Gotenba (JP); Masaki Matsunaga, Odawara (JP); Masahiro Iwasaki, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 15/402,472

(22) Filed: Jan. 10, 2017

(65) Prior Publication Data

US 2017/0261980 A1 Sep. 14, 2017

(30) Foreign Application Priority Data

Mar. 10, 2016 (JP) .................................. 2016-047206

(51) Int. Cl.
  *G05D 1/00* (2006.01)
  *B60W 50/08* (2020.01)
  *B60W 40/09* (2012.01)

(52) U.S. Cl.
  CPC ........... *G05D 1/0061* (2013.01); *B60W 40/09* (2013.01); *B60W 50/08* (2013.01); *B60W 50/082* (2013.01); *G05D 1/0088* (2013.01); *B60K 2370/175* (2019.05); *B60W 2520/00* (2013.01); *B60W 2540/215* (2020.02); *B60W 2540/22* (2013.01); *B60W 2555/00* (2020.02)

(58) Field of Classification Search
  None
  See application file for complete search history.

(56) References Cited

U.S. PATENT DOCUMENTS

| | | | |
|---|---|---|---|
| 8,670,891 B1 | 3/2014 | Szybalski et al. | |
| 9,188,985 B1 | 11/2015 | Hobbs et al. | |
| 2007/0032913 A1 | 2/2007 | Ghoneim et al. | |
| 2015/0344027 A1 | 12/2015 | Oooka et al. | |
| 2016/0026182 A1* | 1/2016 | Boroditsky | H04L 67/306 701/23 |
| 2016/0200317 A1* | 7/2016 | Danzl | B60K 28/06 701/25 |

(Continued)

FOREIGN PATENT DOCUMENTS

| | | | | |
|---|---|---|---|---|
| DE | 102014215276 A1 * | 2/2016 | | B60W 30/182 |
| DE | 102016200513 A1 * | 7/2017 | | B60N 2/0276 |

(Continued)

*Primary Examiner* — Kelly D Williams
(74) *Attorney, Agent, or Firm* — Sughrue Mion, PLLC

(57) ABSTRACT

A control system for a vehicle comprises an automated driving control part configured to automatically perform driver assistance operations for which the driver has given permission among a plurality of driver assistance operations. The automated driving control part comprises a package determining part using at least one of the surrounding environment information, the host vehicle information, and the driver information as the basis to determine a driver assistance package packaging permissions for a plurality of driver assistance operations and a package proposing part proposing to the driver to switch to a driver assistance package so as to obtain permissions for the individual driver assistance operations permitted in the driver assistance package.

11 Claims, 10 Drawing Sheets

| | OPERATION ASSISTANCE OPERATIONS | CLEAR | RAIN | HEAVY RAIN | SNOW | HEAVY SNOW | FOG | DENSE FOG | WIND | STRONG WIND |
|---|---|---|---|---|---|---|---|---|---|---|
| DRIVING ASSISTANCE FUNCTIONS | VEHICLE DISTANCE CONTROL | ○ | ○ | ○ | ○ | ○ | ○ | ○ | ○ | ○ |
| | LANE KEEPING CONTROL | ○ | ○ | × | ○ | × | ○ | × | ○ | ○ |
| | AUTOMATIC LANE CHANGE | ○ | × | × | × | × | × | × | × | × |
| | AUTOMATIC PASSING | ○ | × | × | × | × | × | × | × | × |
| | AUTOMATIC TURNOFF | ○ | × | × | × | × | × | × | ○ | × |
| | AUTOMATIC MERGING | ○ | × | × | × | × | × | × | ○ | × |
| VISIBILITY ASSISTANCE FUNCTIONS | LANE DEPARTURE WARNING | × | ○ | × | ○ | × | ○ | × | ○ | ○ |
| | BLIND SPOT MONITOR | × | ○ | × | ○ | × | ○ | × | ○ | ○ |
| | OTHER VEHICLE PROXIMITY WARNING | × | ○ | × | ○ | × | ○ | × | ○ | ○ |
| | PEDESTRIAN PROXIMITY WARNING | × | × | × | × | × | × | × | ○ | ○ |
| | HIGH BEAM AUTOMATIC CHANGE | × | × | × | × | × | × | × | × | × |
| | HEADLIGHT AUTOMATIC DIRECTION CONTROL | × | × | ○ | × | × | × | × | × | × |
| | HEADLIGHT/FOG LAMP AUTOMATIC TURN ON | × | × | ○ | × | × | ○ | ○ | × | × |
| | WIPER AUTOMATIC OPERATION | × | ○ | ○ | ○ | ○ | × | × | × | × |
| | DEFROSTER AUTOMATIC OPERATION | × | ○ | ○ | ○ | ○ | × | × | × | × |
| | NIGHT VIEW AUTOMATIC OPERATION | × | × | × | × | × | × | × | × | × |
| | PRESENTATION OF SURROUNDING SITUATION | × | × | × | × | × | × | × | × | × |
| CONGESTION ASSISTANCE FUNCTIONS | AUTOMATIC RESTART FROM STOPPED STATE AT TIME OF CONGESTION | × | × | × | × | × | × | × | × | × |
| | HAZARD LAMP TEMPORARY TURN ON CONTROL | × | × | × | × | × | × | × | × | × |
| | AIR-CONDITIONER INSIDE AIR CIRCULATION AUTOMATIC SWITCHING | × | × | × | × | × | × | × | × | × |
| | CHANGE OF SEAT POSITION | × | × | × | × | × | × | × | × | × |
| | PRESENTATION OF CONGESTION INFORMATION | × | × | × | × | × | × | × | × | × |
| | MOVIE PLAYBACK | × | × | × | × | × | × | × | × | × |
| | AUDIO VOLUME AUTOMATIC ADJUSTMENT | × | × | × | × | × | × | × | × | × |
| | JERK REDUCING RUNNING CONTROL | × | × | × | × | × | × | × | × | × |

(56) References Cited

U.S. PATENT DOCUMENTS

2017/0205823 A1* 7/2017 Arndt .................... B60W 50/14
2017/0212515 A1* 7/2017 Bertollini ................. B60Q 9/00

FOREIGN PATENT DOCUMENTS

| JP | 09-086223 A | 3/1997 |
| JP | 11-102157 A | 4/1999 |
| JP | 2010-000923 A | 1/2010 |
| JP | 2015-228091 A | 12/2015 |
| WO | 2015024616 A1 | 2/2015 |

* cited by examiner

FIG. 4

|  | OPERATION ASSISTANCE OPERATIONS |
|---|---|
| DRIVING ASSISTANCE FUNCTIONS | VEHICLE DISTANCE CONTROL |
| | LANE KEEPING CONTROL |
| | AUTOMATIC LANE CHANGE |
| | AUTOMATIC PASSING |
| | AUTOMATIC TURNOFF |
| | AUTOMATIC MERGING |
| VISIBILITY ASSISTANCE FUNCTIONS | LANE DEPARTURE WARNING |
| | BLIND SPOT MONITOR |
| | OTHER VEHICLE PROXIMITY WARNING |
| | PEDESTRIAN PROXIMITY WARNING |
| | HIGH BEAM AUTOMATIC CHANGE |
| | HEADLIGHT AUTOMATIC DIRECTION CONTROL |
| | HEADLIGHT/FOG LAMP AUTOMATIC TURN ON |
| | WIPER AUTOMATIC OPERATION |
| | DEFROSTER AUTOMATIC OPERATION |
| | NIGHT VIEW AUTOMATIC OPERATION |
| | PRESENTATION OF SURROUNDING SITUATION |
| CONGESTION ASSISTANCE FUNCTIONS | AUTOMATIC RESTART FROM STOPPED STATE AT TIME OF CONGESTION |
| | HAZARD LAMP TEMPORARY TURN ON CONTROL |
| | AIR-CONDITIONER INSIDE AIR CIRCULATION AUTOMATIC SWITCHING |
| | CHANGE OF SEAT POSITION |
| | PRESENTATION OF CONGESTION INFORMATION |
| | MOVIE PLAYBACK |
| | AUDIO VOLUME AUTOMATIC ADJUSTMENT |
| | JERK REDUCING RUNNING CONTROL |

FIG. 5

| | OPERATION ASSISTANCE OPERATIONS | CLEAR | RAIN | HEAVY RAIN | SNOW | HEAVY SNOW | FOG | DENSE FOG | WIND | STRONG WIND |
|---|---|---|---|---|---|---|---|---|---|---|
| DRIVING ASSISTANCE FUNCTIONS | VEHICLE DISTANCE CONTROL | O | O | O | O | O | O | O | O | O |
| | LANE KEEPING CONTROL | O | O | X | O | X | O | X | O | O |
| | AUTOMATIC LANE CHANGE | O | X | X | X | X | X | X | X | X |
| | AUTOMATIC PASSING | O | X | X | X | X | X | X | X | X |
| | AUTOMATIC TURNOFF | O | X | X | X | X | X | X | O | X |
| | AUTOMATIC MERGING | O | X | X | X | X | X | X | O | X |
| | LANE DEPARTURE WARNING | X | O | X | O | X | O | X | O | O |
| | BLIND SPOT MONITOR | X | O | X | O | X | O | X | O | O |
| | OTHER VEHICLE PROXIMITY WARNING | X | X | X | X | X | X | X | O | O |
| | PEDESTRIAN PROXIMITY WARNING | X | X | X | X | X | X | X | X | X |
| VISIBILITY ASSISTANCE FUNCTIONS | HIGH BEAM AUTOMATIC CHANGE | X | X | X | X | X | X | X | X | X |
| | HEADLIGHT AUTOMATIC DIRECTION CONTROL | X | X | O | X | X | X | X | X | X |
| | HEADLIGHT/FOG LAMP AUTOMATIC TURN ON | X | X | O | X | X | O | O | X | X |
| | WIPER AUTOMATIC OPERATION | X | O | O | O | O | X | X | X | X |
| | DEFROSTER AUTOMATIC OPERATION | X | X | X | O | O | X | X | X | X |
| | NIGHT VIEW AUTOMATIC OPERATION | X | X | X | X | X | X | X | X | X |
| | PRESENTATION OF SURROUNDING SITUATION | X | X | X | X | X | X | X | X | X |
| CONGESTION ASSISTANCE FUNCTIONS | AUTOMATIC RESTART FROM STOPPED STATE AT TIME OF CONGESTION | X | X | X | X | X | X | X | X | X |
| | HAZARD LAMP TEMPORARY TURN ON CONTROL | X | X | X | X | X | X | X | X | X |
| | AIR-CONDITIONER INSIDE AIR CIRCULATION AUTOMATIC SWITCHING | X | X | X | X | X | X | X | X | X |
| | CHANGE OF SEAT POSITION | X | X | X | X | X | X | X | X | X |
| | PRESENTATION OF CONGESTION INFORMATION | X | X | X | X | X | X | X | X | X |
| | MOVIE PLAYBACK | X | X | X | X | X | X | X | X | X |
| | AUDIO VOLUME AUTOMATIC ADJUSTMENT | X | X | X | X | X | X | X | X | X |
| | JERK REDUCING RUNNING CONTROL | X | X | X | X | X | X | X | X | X |

FIG. 6

| | OPERATION ASSISTANCE OPERATIONS | DAY | NIGHT |
|---|---|---|---|
| DRIVING ASSISTANCE FUNCTIONS | VEHICLE DISTANCE CONTROL | O | O |
| | LANE KEEPING CONTROL | O | O |
| | AUTOMATIC LANE CHANGE | O | O |
| | AUTOMATIC PASSING | O | O |
| | AUTOMATIC TURNOFF | O | O |
| | AUTOMATIC MERGING | O | O |
| VISIBILITY ASSISTANCE FUNCTIONS | LANE DEPARTURE WARNING | × | × |
| | BLIND SPOT MONITOR | × | × |
| | OTHER VEHICLE PROXIMITY WARNING | × | × |
| | PEDESTRIAN PROXIMITY WARNING | × | × |
| | HIGH BEAM AUTOMATIC CHANGE | × | O |
| | HEADLIGHT AUTOMATIC DIRECTION CONTROL | × | O |
| | HEADLIGHT/FOG LAMP AUTOMATIC TURN ON | × | × |
| | WIPER AUTOMATIC OPERATION | × | × |
| | DEFROSTER AUTOMATIC OPERATION | × | × |
| | NIGHT VIEW AUTOMATIC OPERATION | × | O |
| | PRESENTATION OF SURROUNDING SITUATION | × | × |
| CONGESTION ASSISTANCE FUNCTIONS | AUTOMATIC RESTART FROM STOPPED STATE AT TIME OF CONGESTION | × | × |
| | HAZARD LAMP TEMPORARY TURN ON CONTROL | × | × |
| | AIR-CONDITIONER INSIDE AIR CIRCULATION AUTOMATIC SWITCHING | × | × |
| | CHANGE OF SEAT POSITION | × | × |
| | PRESENTATION OF CONGESTION INFORMATION | × | × |
| | MOVIE PLAYBACK | × | × |
| | AUDIO VOLUME AUTOMATIC ADJUSTMENT | × | × |
| | JERK REDUCING RUNNING CONTROL | × | × |

FIG. 7

| | OPERATION ASSISTANCE OPERATIONS | GENERAL ROAD | TRUNK ROAD | INTERCITY EXPRESSWAY | METROPOLITAN EXPRESSWAY |
|---|---|---|---|---|---|
| DRIVING ASSISTANCE FUNCTIONS | VEHICLE DISTANCE CONTROL | O | O | O | O |
| | LANE KEEPING CONTROL | O | O | × | O |
| | AUTOMATIC LANE CHANGE | O | × | × | × |
| | AUTOMATIC PASSING | O | × | × | × |
| | AUTOMATIC TURNOFF | O | × | × | × |
| | AUTOMATIC MERGING | O | × | × | × |
| VISIBILITY ASSISTANCE FUNCTIONS | LANE DEPARTURE WARNING | O | O | × | O |
| | BLIND SPOT MONITOR | O | O | × | O |
| | OTHER VEHICLE PROXIMITY WARNING | O | O | × | O |
| | PEDESTRIAN PROXIMITY WARNING | O | × | × | × |
| | HIGH BEAM AUTOMATIC CHANGE | O | × | O | × |
| | HEADLIGHT AUTOMATIC DIRECTION CONTROL | O | × | O | × |
| | HEADLIGHT/FOG LAMP AUTOMATIC TURN ON | O | O | O | O |
| | WIPER AUTOMATIC OPERATION | O | O | × | O |
| | DEFROSTER AUTOMATIC OPERATION | × | × | × | × |
| | NIGHT VIEW AUTOMATIC OPERATION | × | × | × | × |
| | PRESENTATION OF SURROUNDING SITUATION | × | × | × | × |
| CONGESTION ASSISTANCE FUNCTIONS | AUTOMATIC RESTART FROM STOPPED STATE AT TIME OF CONGESTION | × | × | × | × |
| | HAZARD LAMP TEMPORARY TURN ON CONTROL | × | × | × | × |
| | AIR-CONDITIONER INSIDE AIR CIRCULATION AUTOMATIC SWITCHING | × | × | × | × |
| | CHANGE OF SEAT POSITION | × | × | × | × |
| | PRESENTATION OF CONGESTION INFORMATION | × | × | × | × |
| | MOVIE PLAYBACK | × | × | × | × |
| | AUDIO VOLUME AUTOMATIC ADJUSTMENT | × | × | × | × |
| | JERK REDUCING RUNNING CONTROL | × | × | × | × |

FIG. 8

| | OPERATION ASSISTANCE OPERATIONS | CONGESTED | NOT CONGESTED |
|---|---|---|---|
| DRIVING ASSISTANCE FUNCTIONS | VEHICLE DISTANCE CONTROL | ○ | ○ |
| | LANE KEEPING CONTROL | ○ | ○ |
| | AUTOMATIC LANE CHANGE | × | ○ |
| | AUTOMATIC PASSING | × | ○ |
| | AUTOMATIC TURNOFF | ○ | ○ |
| | AUTOMATIC MERGING | ○ | ○ |
| VISIBILITY ASSISTANCE FUNCTIONS | LANE DEPARTURE WARNING | ○ | × |
| | BLIND SPOT MONITOR | ○ | × |
| | OTHER VEHICLE PROXIMITY WARNING | ○ | × |
| | PEDESTRIAN PROXIMITY WARNING | ○ | × |
| | HIGH BEAM AUTOMATIC CHANGE | ○ | × |
| | HEADLIGHT AUTOMATIC DIRECTION CONTROL | ○ | × |
| | HEADLIGHT/FOG LAMP AUTOMATIC TURN ON | ○ | × |
| | WIPER AUTOMATIC OPERATION | ○ | × |
| | DEFROSTER AUTOMATIC OPERATION | ○ | × |
| | NIGHT VIEW AUTOMATIC OPERATION | ○ | × |
| | PRESENTATION OF SURROUNDING SITUATION | ○ | × |
| CONGESTION ASSISTANCE FUNCTIONS | AUTOMATIC RESTART FROM STOPPED STATE AT TIME OF CONGESTION | ○ | × |
| | HAZARD LAMP TEMPORARY TURN ON CONTROL | ○ | × |
| | AIR-CONDITIONER INSIDE AIR CIRCULATION AUTOMATIC SWITCHING | ○ | × |
| | CHANGE OF SEAT POSITION | ○ | × |
| | PRESENTATION OF CONGESTION INFORMATION | ○ | × |
| | MOVIE PLAYBACK | ○ | × |
| | AUDIO VOLUME AUTOMATIC ADJUSTMENT | ○ | × |
| | JERK REDUCING RUNNING CONTROL | ○ | × |

FIG. 9

| | OPERATION ASSISTANCE OPERATIONS | SLEEPY | TIRED | OVERWORKED | DISTRACTED | NORMAL |
|---|---|---|---|---|---|---|
| DRIVING ASSISTANCE FUNCTIONS | VEHICLE DISTANCE CONTROL | ○ | ○ | ○ | ○ | ○ |
| | LANE KEEPING CONTROL | ○ | ○ | ○ | ○ | ○ |
| | AUTOMATIC LANE CHANGE | × | ○ | ○ | × | ○ |
| | AUTOMATIC PASSING | × | ○ | × | × | ○ |
| | AUTOMATIC TURNOFF | ○ | × | ○ | × | ○ |
| | AUTOMATIC MERGING | ○ | × | × | × | ○ |
| VISIBILITY ASSISTANCE FUNCTIONS | LANE DEPARTURE WARNING | × | × | × | × | × |
| | BLIND SPOT MONITOR | × | × | × | × | × |
| | OTHER VEHICLE PROXIMITY WARNING | × | × | × | × | × |
| | PEDESTRIAN PROXIMITY WARNING | × | × | × | × | × |
| | HIGH BEAM AUTOMATIC CHANGE | × | × | × | × | × |
| | HEADLIGHT AUTOMATIC DIRECTION CONTROL | × | × | × | × | × |
| | HEADLIGHT/FOG LAMP AUTOMATIC TURN ON | × | × | × | × | × |
| | WIPER AUTOMATIC OPERATION | × | × | × | × | × |
| | DEFROSTER AUTOMATIC OPERATION | × | × | × | × | × |
| | NIGHT VIEW AUTOMATIC OPERATION | × | × | × | × | × |
| | PRESENTATION OF SURROUNDING SITUATION | × | × | × | × | × |
| CONGESTION ASSISTANCE FUNCTIONS | AUTOMATIC RESTART FROM STOPPED STATE AT TIME OF CONGESTION | × | × | × | × | × |
| | HAZARD LAMP TEMPORARY TURN ON CONTROL | × | × | × | × | × |
| | AIR-CONDITIONER INSIDE AIR CIRCULATION AUTOMATIC SWITCHING | × | × | × | × | × |
| | CHANGE OF SEAT POSITION | × | × | × | × | × |
| | PRESENTATION OF CONGESTION INFORMATION | × | × | × | × | × |
| | MOVIE PLAYBACK | × | × | × | × | × |
| | AUDIO VOLUME AUTOMATIC ADJUSTMENT | × | × | × | × | × |
| | JERK REDUCING RUNNING CONTROL | × | × | × | × | × |

FIG. 10

| | OPERATION ASSISTANCE OPERATIONS | UNSTABLE | STABLE |
|---|---|---|---|
| DRIVING ASSISTANCE FUNCTIONS | VEHICLE DISTANCE CONTROL | ○ | ○ |
| | LANE KEEPING CONTROL | ○ | ○ |
| | AUTOMATIC LANE CHANGE | × | ○ |
| | AUTOMATIC PASSING | × | ○ |
| | AUTOMATIC TURNOFF | × | ○ |
| | AUTOMATIC MERGING | × | ○ |
| VISIBILITY ASSISTANCE FUNCTIONS | LANE DEPARTURE WARNING | × | × |
| | BLIND SPOT MONITOR | × | × |
| | OTHER VEHICLE PROXIMITY WARNING | × | × |
| | PEDESTRIAN PROXIMITY WARNING | × | × |
| | HIGH BEAM AUTOMATIC CHANGE | × | × |
| | HEADLIGHT AUTOMATIC DIRECTION CONTROL | × | × |
| | HEADLIGHT/FOG LAMP AUTOMATIC TURN ON | × | × |
| | WIPER AUTOMATIC OPERATION | × | × |
| | DEFROSTER AUTOMATIC OPERATION | × | × |
| | NIGHT VIEW AUTOMATIC OPERATION | × | × |
| | PRESENTATION OF SURROUNDING SITUATION | × | × |
| CONGESTION ASSISTANCE FUNCTIONS | AUTOMATIC RESTART FROM STOPPED STATE AT TIME OF CONGESTION | × | × |
| | HAZARD LAMP TEMPORARY TURN ON CONTROL | × | × |
| | AIR-CONDITIONER INSIDE AIR CIRCULATION AUTOMATIC SWITCHING | × | × |
| | CHANGE OF SEAT POSITION | × | × |
| | PRESENTATION OF CONGESTION INFORMATION | × | × |
| | MOVIE PLAYBACK | × | × |
| | AUDIO VOLUME AUTOMATIC ADJUSTMENT | × | × |
| | JERK REDUCING RUNNING CONTROL | × | × |

CONTROL SYSTEM FOR VEHICLE

CROSS-REFERENCE TO RELATED APPLICATION

This application claims priority based on Japanese Patent Application No. 2016-047206 filed with the Japan Patent Office on Mar. 10, 2016, the entire contents of which are incorporated into the present specification by reference.

TECHNICAL FIELD

The present invention relates to a control system for a vehicle.

BACKGROUND ART

The specification of U.S. Pat. No. 8,670,891 discloses a conventional control system for a vehicle in which when a driver operates a switch to change from a manual driving mode to an automated driving mode, the distance between vehicles is controlled, lanes are kept, and other driver assistance operations are automatically performed as automated driving.

SUMMARY

However, the above-mentioned conventional control system for a vehicle used the fact of switching to the automated driving mode to judge the driver gave permission for all driver assistance operations. Therefore, in starting automated driving, the driver was only able to perform an operation for switching from the manual driving mode to the automated driving mode. He was not able to freely set permission for the individual driver assistance operations.

Here, in starting automated driving, enabling the driver to set permission for the individual driver assistance operations according to the actual situation before the start of or during automated driving would be desirable since, for example, it would enable prevention of driver assistance operations not required by the driver being automatically performed. However, the actual situation changes with each instant while a vehicle is being driven, so there is the problem that it was difficult for the driver to himself set permission for individual driver assistance operations to enable automated driving tailored to the actual situation.

The present invention was made in consideration of such a problem and has as its object to enable automated driving tailored to the actual situation to be easily set by the driver.

To solve this problem, according to one aspect of the present invention, there is provided a control system for a vehicle for controlling the vehicle comprising a surrounding environment information acquiring device configured to acquire surrounding environment information relating to surrounding environmental conditions of a host vehicle, a host vehicle information acquiring device configured to acquire host vehicle information relating to conditions of the host vehicle and a driver information acquiring device configured to acquire driver information relating to conditions of a driver of the host vehicle. The control system comprises an automated driving control part configured to automatically perform driver assistance operations for which the driver has given permission among a plurality of driver assistance operations. The automated driving control part comprises a package determining part configured to use at least one of the surrounding environment information, the host vehicle information, and the driver information as the basis to determine a driver assistance package packaging permissions for a plurality of driver assistance operations and a package proposing part configured to propose to the driver to switch to a driver assistance package so as to obtain permissions for the individual driver assistance operations permitted in the driver assistance package.

According to this aspect of the present invention, it is possible to enable automated driving tailored to the actual situation to be easily started by the driver.

BRIEF DESCRIPTION OF DRAWINGS

FIG. 4 is a view showing a list of driver assistance operations performed during an automated driving mode.

FIG. 5 is a view showing a group of packages relating to weather conditions.

FIG. 6 is a view showing a group of packages relating to sunlight conditions.

FIG. 7 is a view showing a group of packages relating to road types.

FIG. 8 is a view showing a group of packages relating to road conditions.

FIG. 9 is a view showing a group of packages relating to driver conditions.

FIG. 10 is a view showing a group of packages relating to host vehicle conditions.

DESCRIPTION OF EMBODIMENTS

Figure 1:
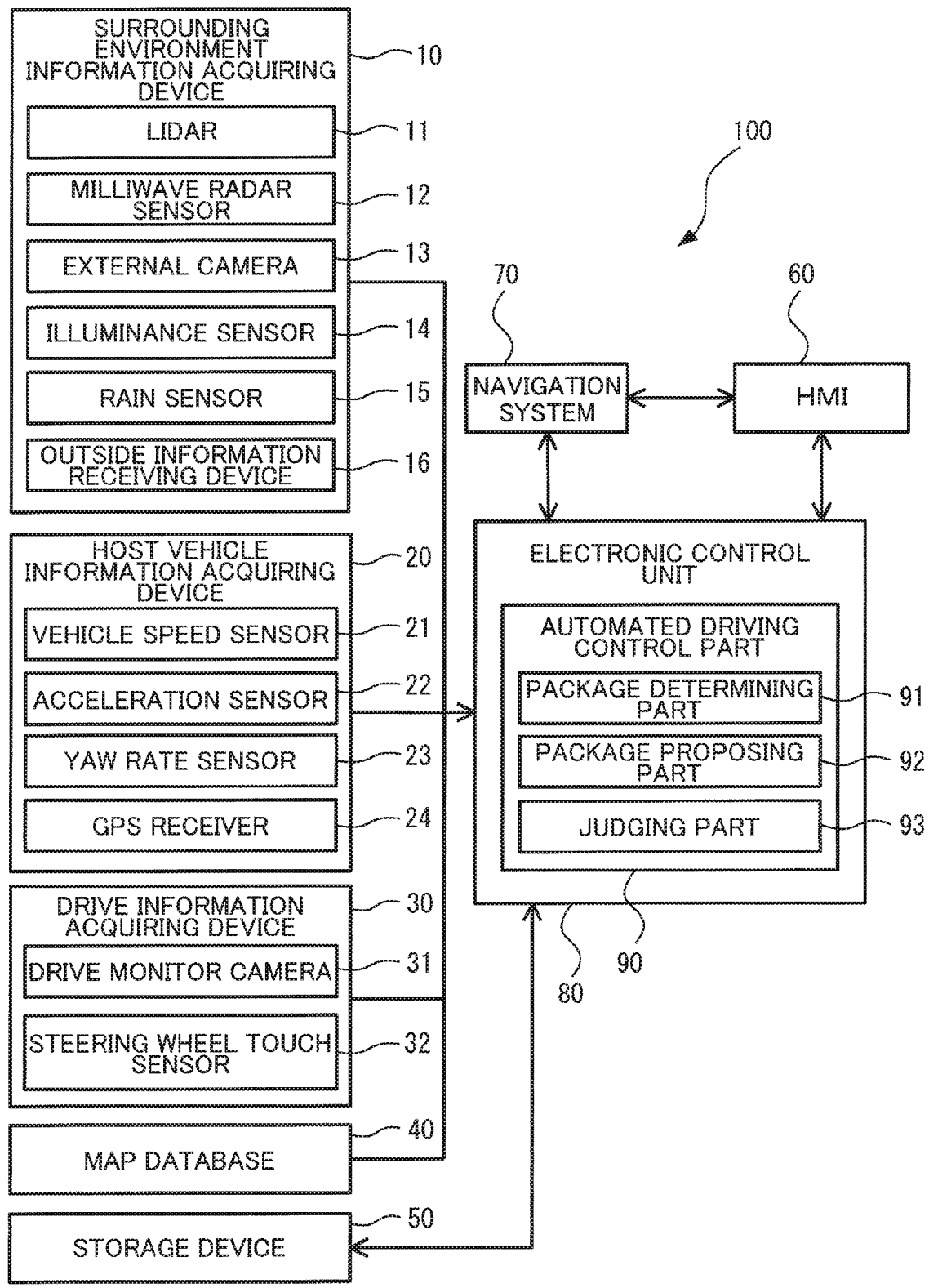
FIG. 1 is a schematic view of the configuration of an automated driving system according to one embodiment of the present invention.

Below, referring to the drawings, embodiments of the present invention will be explained in detail. Note that, in the following explanation, similar component elements will be assigned the same reference notations.

Figure 2:
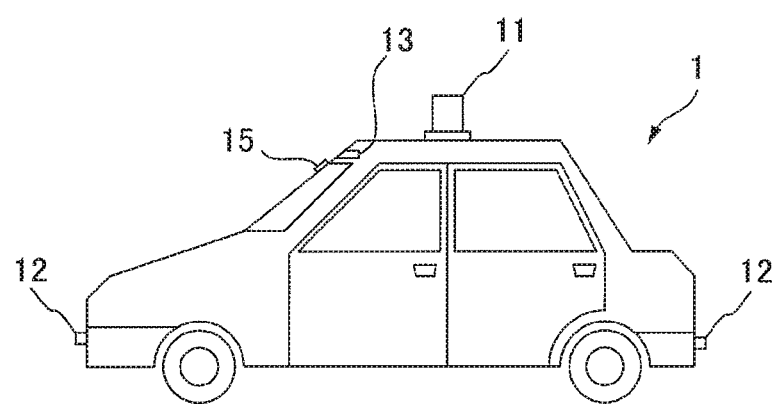
FIG. 2 is a schematic view of the appearance of a host vehicle mounting an automated driving system according to an embodiment of the present invention.
Figure 3:
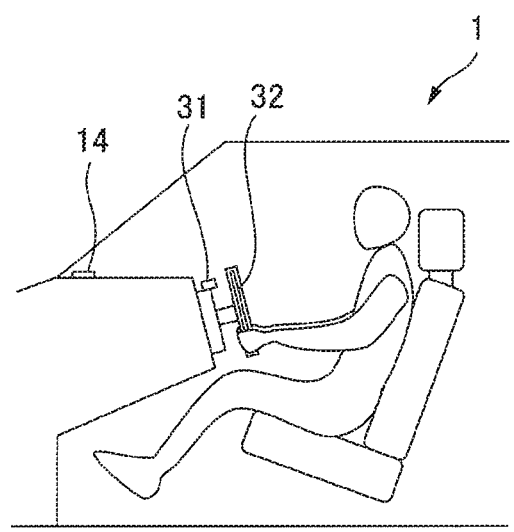
FIG. 3 is a schematic view of the inside of a host vehicle mounting an automated driving system according to an embodiment of the present invention.

FIG. 1 is a schematic view of the configuration of an automated driving system 100 of a vehicle according to one embodiment of the present invention. FIG. 2 is a schematic view of the appearance of a host vehicle 1 mounting the automated driving system 100 according to the present embodiment. FIG. 3 is a schematic view of the inside of the host vehicle 1 mounting the automated driving system 100 according to the present embodiment.

As shown in FIG. 1, the automated driving system 100 according to the present embodiment is provided with a surrounding environment information acquiring device 10, a host vehicle information acquiring device 20, a driver information acquiring device 30, a map database 40, a storage device 50, a human-machine interface (below, referred to as an "HMI") 60, a navigation system 70, and an electronic control unit 80.

The surrounding environment information acquiring device 10 is a device for acquiring information relating to obstacles in the surroundings of the host vehicle (for example, buildings, moving vehicles such as vehicles in front of it and in back of it on the road and oncoming vehicles, stopped vehicles, the curb, fallen objects, pedestrians, etc.) and the weather and other such surrounding environmental conditions of the host vehicle 1 (below, referred to as the "surrounding environment information"). As shown in FIG. 1 to FIG. 3, the surrounding environment information acquiring device 10 according to the present embodiment is provided with a LIDAR (laser imaging detection and ranging) device 11, milliwave radar sensors 12, an external camera 13, illuminance sensor 14, rain sensor 15, and outside information receiving device 16.

The LIDAR device 11 uses laser beams to detect the road and obstacles in the host vehicle surroundings. As shown in FIG. 2, in the present embodiment, the LIDAR device 11 is, for example, attached to the roof of the host vehicle 1. The LIDAR device 11 successively fires laser beams toward the overall surroundings of the host vehicle 1 and measures the distances to the road and host vehicle surroundings from the reflected light. Further, the LIDAR device 11 uses the results of measurement as the basis to generate 3D images of the road and obstacles in the overall surroundings of the host vehicle 1 and sends information of the generated 3D images to the electronic control unit 80.

The milliwave radar sensors 12 utilize electromagnetic waves to detect obstacles in the host vehicle surroundings at a farther distance than the LIDAR device 11. As shown in FIG. 2, in the present embodiment, the milliwave radar sensors 12, for example, are attached to the front bumper and rear bumper of the host vehicle 1. The milliwave radar sensors 12 emit electromagnetic waves to the surroundings of the host vehicle 1 (in the present embodiment, the front, rear, and sides of the host vehicle 1) and use the reflected waves to measure the distances to obstacles in the host vehicle surroundings and the relative speed with the obstacles. Further, the milliwave radar sensors 12 send the results of measurement as host vehicle surrounding information to the electronic control unit 80.

Note that, the locations of attachment of the milliwave radar sensors 12 are not particularly limited so long as locations where the necessary host vehicle surrounding information can be acquired. For example, they may also be attached to the grilles or to the insides of the headlights or brake lights and other such lights of the host vehicle 1 or may be attached to parts of the body (frame) of the host vehicle 1.

The external camera 13 captures an image of the area in front of the host vehicle 1. As shown in FIG. 2, in the present embodiment, the external camera 13 is, for example, attached to the center part of the front of the roof of the host vehicle 1. The external camera 13 processes the captured image of the area in front of the host vehicle to detect information on obstacles in front of the host vehicle, the width of the lane of the road driven on and the road shape, road signs, white lines, the state of traffic lights, and other road information in the area in front of the host vehicle, the yaw angle (relative direction of vehicle with respect to lane driven on), the offset position of the vehicle from the center of the lane driven on, and other such driving information of the host vehicle 1, rain or snow or fog and other such weather information of the host vehicle surroundings, etc. Further, the external camera 13 sends the detected image information to the electronic control unit 80.

Note that, the location of attachment of the external camera 13 is not particularly limited so long as a location able to capture an image of the area in front of the host vehicle 1. For example, the camera may also be attached to the top of the center part of the back surface of the front glass of the host vehicle.

The illuminance sensor 14 detects the illuminance in the host vehicle surroundings. As shown in FIG. 2, in the present embodiment, the illuminance sensor 14 is, for example, attached to the top surface of the instrument panel of the host vehicle. The illuminance sensor 14 sends the detected illuminance information of the host vehicle surroundings to the electronic control unit 80.

The rain sensor 15 detects the presence of rainfall and the amount of rainfall. As shown in FIG. 2, in the present embodiment, the rain sensor 15 is, for example, attached to the top of the center of the front surface of the front glass of the host vehicle 1. The rain sensor 15 fires light generated by a built-in light emitting diode toward the front surface of the front glass and measures the change in the reflected light at that time so as to detect the presence of rainfall, the amount of rainfall, and other rainfall information. Further, the rain sensor 15 sends the detected rainfall information to the electronic control unit 80.

The outside information receiving device 16, for example, receives congestion information, weather information (rain, snow, fog, wind speed, and other information), and other outside information road sent from a traffic information communication system center or other outside communication center. The outside information receiving device 16 sends the received outside information to the electronic control unit 80.

The host vehicle information acquiring device 20 is a device for acquiring a speed or acceleration, posture, and current position of the host vehicle 1 and other such information relating to the conditions of the host vehicle 1 (below, referred to as "host vehicle information"). As shown in FIG. 1, the host vehicle information acquiring device 20 according to the present embodiment is provided with a vehicle speed sensor 21, acceleration sensor 22, yaw rate sensor 23, and GPS receiver 24.

The vehicle speed sensor 21 is a sensor for detecting the speed of the host vehicle 1. The vehicle speed sensor 21 sends the detected vehicle speed information of the host vehicle 1 to the electronic control unit 80.

The acceleration sensor 22 is a sensor for detecting the acceleration of the host vehicle 1 at the time of accelerating or the time of braking. The acceleration sensor 22 sends the detected acceleration information of the host vehicle 1 to the electronic control unit 80.

The yaw rate sensor 23 is a sensor for detecting the posture of the host vehicle 1, more specifically detects the speed of change of the yaw angle at the time the host vehicle 1 turns, that is, the rotational angular speed (yaw rate) about the vertical axis of the host vehicle 1. The yaw rate sensor 23 sends the detected posture information of the host vehicle 1 to the electronic control unit 80.

The GPS receiver 24 receives signals from three or more GPS satellites to identify the longitude and latitude of the host vehicle 1 and detect the current position of the host vehicle 1. The GPS receiver 24 sends the detected current position information of the host vehicle 1 to the electronic control unit 80.

The driver information acquiring device 30 is a device for acquiring information relating to the condition of the driver of the host vehicle 1 (below, referred to as the "driver information"). As shown in FIG. 1 and FIG. 3, the driver information acquiring device 30 according to the present embodiment is provided with a driver monitor camera 31 and a steering wheel touch sensor 32.

The driver monitor camera 31 is attached to the top surface of the steering wheel column cover and captures an image of the appearance of the driver. The driver monitor camera 31 processes the captured image of the driver to detect information on the driver (direction of face of driver, degree of opening of eyes, etc.) and information on the appearance of the driver such as his posture. Further, the driver monitor camera 31 sends the detected information of the appearance of the driver to the electronic control unit 80.

The steering wheel touch sensor 32 is attached to the steering wheel. The steering wheel touch sensor 32 detects whether the driver is gripping the steering wheel and sends the detected information on the gripping of the steering wheel to the electronic control unit 80.

The map database 40 is a database relating to map information. This map database 40 is for example stored in a hard disk drive (HDD) mounted in the vehicle. The map information includes positional information on the roads, information on the road shapes (for example, curves or straight stretches, curvature of curves, etc.), positional information on the intersections and turn-off points, information on the road types, etc.

The storage device 50 stores a road map designed for automated driving. The automated driving use road map is prepared by the electronic control unit 80 based on the 3D image generated by the LIDAR device 11 and constantly or periodically updated by the electronic control unit 80.

The HMI 60 is an interface for input and output of information between the driver or a passenger with the automated driving system 100. The HMI 60 is, for example, configured by a display showing text or image information or a speaker emitting sound, operating buttons or a touch panel for the driver or passengers to input information, etc.

The navigation system 70 is an apparatus for guiding the host vehicle 1 to a destination set by the driver through the HMI 60. The navigation system 70 uses the current position information of the host vehicle 1 detected by the UPS receiver 24 and map information of the map database 40 as the basis to calculate the target route to the destination and transmits the information of the calculated target route as navigation information to the electronic control unit 80.

The electronic control unit 80 is a microcomputer comprised of components connected with each other by a bidirectional bus such as a central processing unit (CPU), read only memory (ROM), random access memory (RAM), input port, and output port.

The electronic control unit 80 is provided with an automated driving control part 90 automatically performing driver assistance operations permitted by the driver from among the individual driver assistance operations shown in FIG. 4 when the driver switches from the manual driving mode (mode where driver performs driving operations relating to accelerating, steering, and braking) to the automated driving mode. The automated driving control part 90 is provided with a package determining part 91, package proposing part 92, and judging part 93. It uses information input to the electronic control unit 80 such as the surrounding environment information, host vehicle information, driver information, navigation information, and various other information required for automated driving as the basis to output control signals for controlling the various control components for performing the different driver assistance operations from the output port to control the vehicle and automatically drive the vehicle.

FIG. 4 is a view showing a list of driver assistance operations performed in the automated driving mode in the present embodiment.

As shown in FIG. 4, in the present embodiment, the driver assistance operations are roughly divided by functions into three groups of functions of driving assistance functions, visibility assistance functions, and congestion assistance functions.

The driver assistance operations classified as "driving assistance functions" are the driver assistance operations having the function of performing at least one of accelerating, steering, and braking (driving assistance functions) among the driver assistance operations. In the present embodiment, as driver assistance operations having driving assistance functions, vehicle distance control, lane keeping control, automatic lane change, automatic passing, automatic turn off, and automatic merging are illustrated, but the driver assistance operations having the driving assistance functions are not limited to these. It is possible to increase these or reduce these from those illustrated in FIG. 4 as needed.

Note that the vehicle distance control is control for automatically adjusting the vehicle speed within the range of the restricted vehicle speed so as to follow a vehicle in front by matching the change in speed of that vehicle while maintaining a suitable vehicle distance corresponding to the vehicle speed. The lane keeping control is control for automatically adjusting the amount of steering or vehicle speed so that the host vehicle 1 runs along a suitable running line corresponding to the width of the lane driven in.

The driver assistance operations classified as "visibility assistance functions" are the driver assistance operations having the functions of securing visibility to the driver and turn safety (visibility assistance functions) in the driver assistance operations not having driving assistance functions (that is, not performing any of accelerating, steering, and braking). In the present embodiment, as driver assistance operations having visibility assistance functions, 11 driver assistance operations such as lane departure warning and blind spot monitoring are illustrated, but the driver assistance operations having the visibility assistance functions are not limited to these. It is possible to increase these or reduce these from those illustrated in FIG. 4 as needed.

The driver assistance operations classified as "congestion assistance functions" are the driver assistance operations having the function of easing the fatigue of the driver and passengers at the time of congestion (congestion assistance functions). In the present embodiment, as driver assistance operations having congestion assistance functions, eight driver assistance operations such as automatic restart from a stopped state at the time of congestion or control for temporarily turning on the hazard lamps are illustrated, but the driver assistance operations having congestion assistance functions are not limited to these. It is possible to increase these or reduce these from those illustrated in FIG. 4 as needed.

Therefore, in performing automated driving, before starting or during automated driving, it is preferable that the driver be able to set permission for the individual driver assistance operations in accordance with the surrounding environmental condition, host vehicle condition, and driver condition.

On the other hand, if the driver has to set permission for each of the driver assistance operations one by one when performing automated driving, it would be extremely troublesome. The convenience of automated driving would also be lost. Further, the surrounding environmental condition, host vehicle condition, and driver condition change with each instant while the vehicle is being driven. Therefore, it is difficult for the driver himself to set permissions for the individual driver assistance operations and therefore realize automated driving tailored to these conditions while driving the vehicle.

Therefore, in the present embodiment, the surrounding environment information, host vehicle information, and driver information are used as the basis to determine a driver assistance package packaging together permissions for the individual driver assistance operations and the determined driver assistance package is proposed to the driver. Specifically, the optimal unit packages corresponding to the weather condition, sunlight condition, road type, road condition, driver condition, and host vehicle condition are selected from the groups of packages shown in FIG. 5 to FIG. 10 and the selected unit packages are combined. The thus determined driver assistance package is proposed to the driver.

Below, referring to FIG. 5 to FIG. 10, the different groups of packages will be explained, then referring to FIG. 11, the automated driving control in the present embodiment will be explained. Note that, from FIG. 5 to FIG. 10, the circle marks indicate permission, while the x marks indicate no permission. Further, the groups of packages are stored in the ROM of the electronic control unit 80.

FIG. 5 is a view showing the group of packages relating to weather conditions. The group of packages relating to weather conditions roughly classify weather conditions into the nine conditions of "clear", "rain", "heavy rain", "snow", "heavy snow", "fog", "dense fog", "wind", and "strong wind" and package permissions for the individual driver assistance operations for each of the weather conditions.

In the present embodiment, weather information of the host vehicle surroundings detected by the external camera 13 (rain or snow, fog, wind speed, and other information) and weather information included in the outside information received by the outside information receiving device 16 (rain or snow, fog, wind speed, and other information) are used as the basis to judge the weather condition.

FIG. 6 is a view showing the group of packages relating to sunlight conditions. The group of packages relating to sunlight conditions roughly classify the sunlight conditions into "day" and "night" and package permissions for the individual driver assistance operations for each of the sunlight conditions.

In the present embodiment, the illuminance information detected by the illuminance sensor 14 and the date and time are used as the basis to judge the sunlight conditions.

FIG. 7 is a view showing the group of packages relating to road types. The group of packages relating to road types roughly classify the road types into "general roads", "trunk roads", "intercity expressways" such as the Tokyo-Nagoya expressway and Nagoya-Kobe expressway, and "metropolitan expressways" such as the Tokyo Metropolitan Expressway and the Osaka Metropolitan Expressway and package permissions for the individual driver assistance operations for each of the road types.

In the present embodiment, the road information in front of the host vehicle detected by the external camera 13 and the road type information included in the map information of the map database 40 are used as the basis to judge the road types.

FIG. 8 is a view showing the group of packages relating to road conditions. The group of packages relating to road conditions roughly classify the road conditions into "congested" and "not congested" and package permissions for the individual driver assistance operations for each of the road conditions. Note that in the present embodiment, "congested" means the state where there are other vehicles in the host vehicle surroundings (vehicles in front or vehicles in back) and the speeds of the host vehicle 1 and the other vehicles in the host vehicle surroundings are continuously a constant speed (for example, on general roads or trunk roads, 20 km/h, while on intercity expressways or metropolitan expressways, 40 km/h) or less. On the other hand, "not congested" means a state other than congested.

In the present embodiment, the information of the 3D images generated by the LIDAR device 11, the host vehicle surrounding information detected by the milliwave radar sensors 12, obstacle information and road information in front of the host vehicle detected by the external camera 13, the congestion information included in the outside information received by the outside information receiving device 16, and the vehicle speed information detected by the vehicle speed sensor 21 are used as the basis to judge the road conditions.

FIG. 9 is a view showing a group of packages relating to the driver conditions. The group of packages relating to driver conditions roughly classify the driver conditions into sleepy, tired, overworked, distracted, and normal and package permissions for the individual driver assistance operations for each of the driver conditions. Note that in the present embodiment, "sleepy" means a condition not of an extent where the driver has to immediately stop driving, but where the concentration of the driver in the driving operation is falling due to sleepiness. "Tired" means a condition not of an extent where the driver has to immediately stop driving, but where the concentration of the driver in the driving operation is falling due to fatigue. "Distracted" means a condition where, for example, the driver is engaged in a second task other than the driving operation such as operating a mobile phone or tablet computer or other mobile device or watching a movie, looking to the side, etc. and therefore the concentration of the driver in the driving operation is falling due to reasons other than sleepiness or fatigue. "Overworked" means a condition of an extent where the driver has to immediately stop driving due to sleepiness, fatigue, or distraction due to which the concentration of the driver in the driving operation is falling. "Normal" means a condition other than sleepy, tired, overworked, and distracted.

In the present embodiment, information of the appearance of the driver detected by the driver monitor camera 31 and information of the grip on the steering wheel detected by the steering wheel touch sensor 32 are Used as the basis to judge the driver condition. Specifically, while referring to the information of the grip of the steering wheel, the information of the driver (direction of face, degree of opening of eyes, etc.) is detected from the information of the appearance of the driver and the detected information of the driver is compared with the information according to the driver condition stored in advance in the ROM to thereby judge the driver condition.

Note that, the indicators for judging the driver condition are not limited to the information of the appearance of the driver or information of the grip on the steering wheel. For example, it is also possible to detect the heartbeat or pulse rate or the brainwaves etc. of the driver and compare these with the heartbeat or pulse rate or the brainwaves etc. corresponding to driver conditions stored in advance in the ROM to judge the driver condition.

FIG. 10 is a view showing a group of packages relating to the host vehicle conditions. The group of packages relating to the host vehicle conditions roughly classify the host vehicle conditions as unstable and stable and package permissions of the individual driver assistance operations for each of the host vehicle conditions. Note that, in the present embodiment, the host vehicle condition being "unstable" means continuous occurrence of pitching, rolling, yawing, etc. and disturbance of behavior of the host vehicle 1. "Pitching" means the state where the vehicle rocks back and forth about the left-right direction horizontal axis passing through the center of gravity of the vehicle. "Rolling" means the state where the vehicle rocks to the left and right about the front-back direction horizontal axis passing through the center of gravity of the vehicle. "Yawing" means the state where the vehicle rocks to the left and right about the vertical axis passing through the center of gravity of the vehicle. On the other hand, the host vehicle condition being "stable" means a state other than unstable, that is, a state where pitching, rolling, yawing, etc. do not occur and the behavior of the host vehicle 1 is not disturbed.

In the present embodiment, the acceleration information detected by the acceleration sensor 22 and the posture information of the host vehicle 1 detected by the yaw rate sensor 23 are used as the basis to judge the host vehicle condition.

Figure 11:
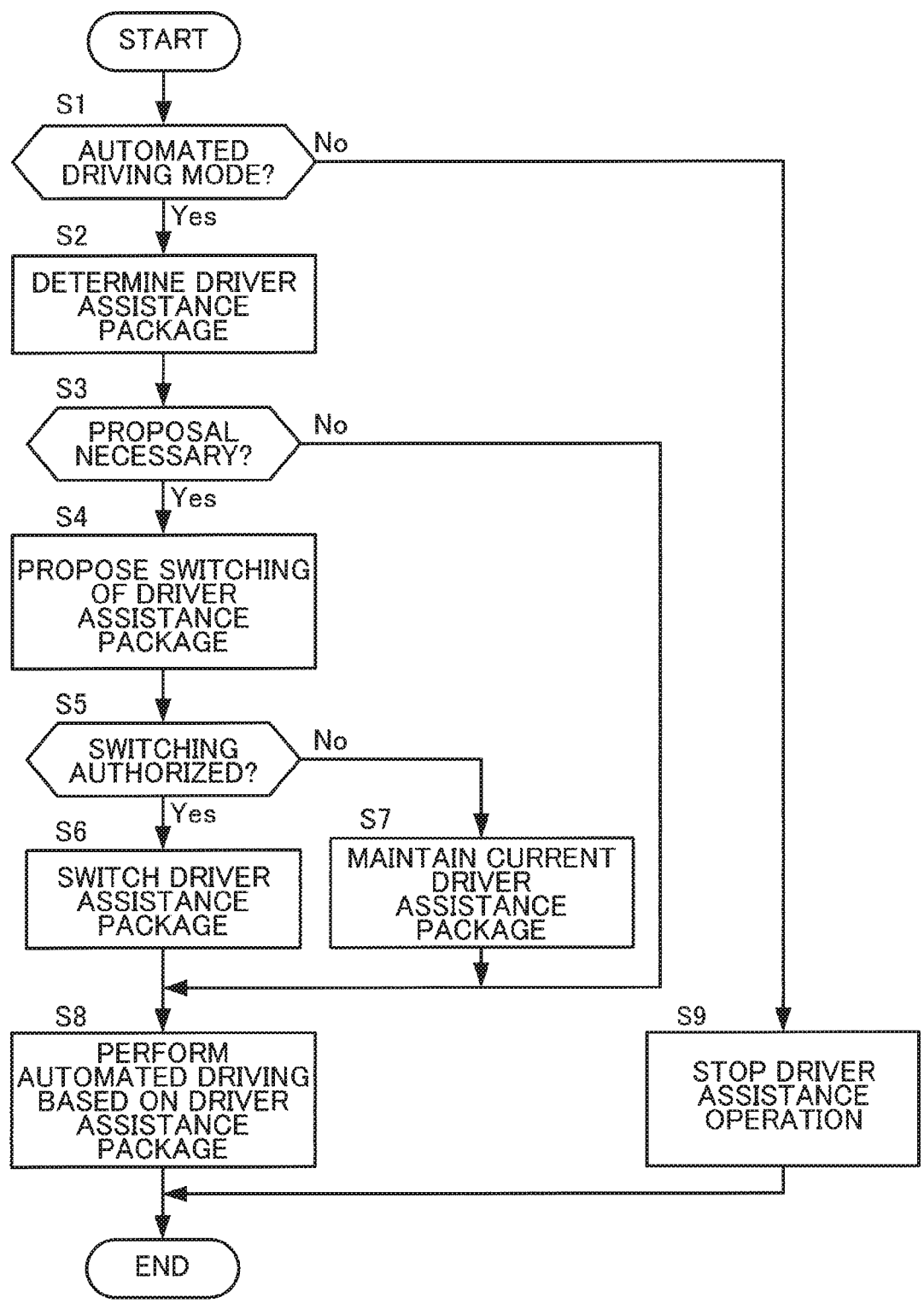
FIG. 11 is a flow chart explaining the automated driving control according to an embodiment of the present invention.

FIG. 11 is a flow chart explaining automated driving control of the present embodiment performed by the electronic control unit 80. The electronic control unit 80 repeatedly performs this routine at a predetermined processing period.

At step S1, the electronic control unit 80 judges if the driving mode of the vehicle is an automated driving mode. The electronic control unit 80 proceeds to the processing of step S2 if the driving mode of the vehicle is the automated driving mode. On the other hand, the electronic control unit 80 proceeds to the processing of step S9 if the driving mode is the manual driving mode.

At step S2, the electronic control unit 80 uses the surrounding environment information, host vehicle information, and driver information as the basis to determine the driver assistance package.

Specifically, the electronic control unit 80 first uses the surrounding environment information, host vehicle information, and driver information as the basis to identify the surrounding environmental conditions (in the present embodiment, the weather condition, sunlight condition, road type, and road condition), host vehicle condition, and driver condition.

Next, the electronic control unit 80 selects the unit package of the weather condition identified as the current weather condition from among the group of packages relating to the weather conditions. For example, when the current weather condition at step S2 is identified as "heavy rain.", the electronic control unit 80 selects the unit package of "heavy rain" from the group of packages relating to the weather conditions. In the same way, the electronic control unit 80 selects the unit package of the sunlight condition identified as the current sunlight condition from among the group of packages relating to the sunlight conditions, selects the unit package of the road type identified as the current road type from among the group of packages relating to the road types, selects the unit package of the road condition identified as the current road condition from among the group of packages relating to the road conditions, selects the unit package of the driver condition identified as the current driver condition from among the group of packages relating to the driver conditions, and selects the unit package of the host vehicle condition identified as the current host vehicle condition from among the group of packages relating to the host vehicle conditions.

Finally, the electronic control unit 80 combines the selected unit packages to determine the driver assistance package. At this time, in the present embodiment, the driving assistance functions are combined by AND conditions while the visibility assistance functions and congestion assistance functions are combined by OR conditions.

Therefore, in the driver assistance operations classified as driving assistance functions, driver assistance operations permitted (circle marks) in all unit packages are permitted in the driver assistance package. On the other hand, driver assistance operations not permitted (x marks) in one or more unit packages are not permitted in the driver assistance package.

Further, in the driver assistance operations classified as visibility assistance functions and congestion assistance functions, driver assistance operations permitted in one or more unit packages are permitted in the driver assistance package. Further, driver assistance operations permitted in all unit packages are permitted in the driver assistance package. On the other hand, driver assistance operations not permitted in all of the unit packages are not permitted in the driver assistance package.

In this way, in the present embodiment, the driving assistance functions are combined by AND conditions and the visibility assistance functions and congestion assistance functions are combined by OR conditions, but the methods of combination are not limited. Combination by AND conditions or OR conditions is possible in accordance with need. Further, it is possible to combine all of the functions by AND conditions or combine them by OR conditions.

It step S3, the electronic control unit 80 judges if it is necessary to propose to the driver the driver assistance package determined at step S2. Specifically, the electronic control unit 80 judges if the driver assistance package determined at step S2 differs from the currently selected driver assistance package. The electronic control unit 80 proceeds to the processing of step S4 if the driver assistance package determined at step S2 differs from the currently selected driver assistance package. On the other hand, the electronic control unit 80 proceeds to the processing of step S8 if the driver assistance package determined at step S2 is the same as the currently selected driver assistance package.

At step S4, the electronic control unit 80 proposes switching to the driver assistance package determined at step S2 to the driver through the HMI 60. Specifically, the electronic control unit 80 displays the driver assistance package determined at step S2 on the display and uses the speaker to propose switching to that driver assistance package.

Here, the driver assistance package packages together in advance the permissions of the individual driver assistance operations. For this reason, when proposing a driver assistance package to the driver, for example, it is possible to propose a driver assistance package by a mode enabling a driver to switch the driver assistance package by a single operation such as by displaying a single authorization button on the touch panel. Therefore, the driver can easily switch the driver assistance package.

At step S5, the electronic control unit 80 judges if switching to the proposed driver assistance package has been authorized by the driver. Specifically, the electronic control unit 80 judges that switching to the proposed driver assistance package has been authorized by the driver when the driver indicates his wish for authorization through the HMI 60 before a predetermined time elapses from when the driver assistance package is proposed. The electronic control unit 80 proceeds to the processing of step S6 when judging that switching to the proposed driver assistance package has been authorized by the driver. On the other hand, the electronic control unit 80 proceeds to the processing of step S7 when judging that switching to the proposed driver assistance package has not been authorized by the driver.

At step S6, the electronic control unit 80 switches the driver assistance package to the driver assistance package determined at step S2.

At step S7, the electronic control unit 80 maintains the current driver assistance package.

At step S8, the electronic control unit 80 uses the driver assistance package permitted by the driver as the basis to automatically control the vehicle. Specifically, it controls the vehicle so that the driver assistance operations permitted in the driver assistance package are automatically performed.

At step S9, the electronic control unit 80 stops the automatic execution of all of the driver assistance operations until the driving mode is switched to the automated driving mode.

Note that, in the present embodiment, the three pieces of information of the surrounding environment information, host vehicle information, and driver information were used as the basis to determine the driver assistance package, but these three pieces of information are not necessarily required. For example, if there is only a group of packages relating to the weather conditions, just the surrounding environment information may be used as the basis to determine the driver assistance package. Further, if there is only a group of packages relating to the host vehicle conditions, just the host vehicle information may be used as the basis to determine the driver assistance package. Further, if there is only a group of packages relating to the driver conditions, just the driver information may be used as the basis to determine the driver assistance package.

In this way, the driver assistance package may be determined based on the required information in accordance with the type of the group of packages stored in the ROM. That is, the driver assistance package may be determined based on at least one of the surrounding environment information, host vehicle information, and driver information in accordance with the type of the group of packages stored in the ROM.

According to the present embodiment explained above, there is provided an electronic control unit 80 (control system) configured to control a vehicle comprising a surrounding environment information acquiring device 10 for acquiring surrounding environment information relating to the surrounding environmental conditions of the host vehicle 1, a host vehicle information acquiring device 20 for acquiring host vehicle information relating to the conditions of the host vehicle 1, and a driver information acquiring device 30 for acquiring driver information relating to the conditions of the driver of the host vehicle 1. The electronic control unit 80 is configured to comprise an automated driving control part 90 automatically performing driver assistance operations permitted by the driver among the plurality of driver assistance operations. Further, the automated driving control part 90 is configured to comprise a package determining part 91 using at least one of the surrounding environment information, host vehicle information, and driver information as the basis to determine a driver assistance package packaging permissions of the plurality of driver assistance operations and a package proposing part 92 proposing to the driver to switch to a driver assistance package to obtain permissions for driver assistance operations permitted in that driver assistance package.

Due to this, when performing automated driving for automatically performing driver assistance operations permitted by the driver from among the plurality of driver assistance operations, it is possible to propose to the driver a driver assistance package tailored to the changed conditions each time the surrounding environmental condition, the host vehicle condition, and the driver condition change. The driver assistance package proposed to the driver packages permissions for the individual driver assistance operations in advance, so the driver no longer has to set permission for an individual driver assistance operation. For this reason, automated driving tailored to the surrounding environmental condition, host vehicle condition, and driver condition can be simply performed by the driver.

Further, the automated driving control part 90 further comprises a judging part 93 judging whether the switching to the driver assistance package proposed by the package proposing part 92 has been authorized by the driver and is configured to automatically perform driver assistance operations according to the result of judgment of the judging part 93. Specifically, it is configured so that when the judging part 93 judges that switching to the driver assistance package has been authorized by the driver, it automatically performs the driver assistance operations permitted in that driver assistance package.

Due to this, whether automated driving should be performed based on the proposed driver assistance package, that is, whether only driver assistance operations permitted in the proposed driver assistance package should be performed, can be determined by the wishes of the driver. Therefore, it is possible to perform automated driving reflecting the wishes of the driver and possible to keep driver assistance operations not desired by the driver from being performed.

Further, the package proposing part 92 is configured to propose to the driver a driver assistance package by a mode whereby the driver can switch to the driver assistance package by a single operation.

Due to this, the driver can easily switch driver assistance packages, so it is possible to more simply perform automated driving suitable for the surrounding environmental condition, host vehicle condition, and driver condition.

Above, embodiments of the present invention were explained, but the above embodiments only show part of the examples of application of the present invention. They are not intended to limit the technical scope of the present invention to the specific constitutions of the embodiments.

For example, in the above embodiments, the different unit packages were combined to prepare a driver assistance package, but it is also possible to select a driver assistance program from ones combined in advance.

REFERENCE SIGNS LIST

Explanation of References

1. host vehicle
10. surrounding environment information acquiring device
20. host vehicle information acquiring device
30. driver information acquiring device
80. electronic control unit (control system)
90. automated driving control part
91. package determining part
92. package proposing part
93. judging part

What is claimed is:

1. A control system for a vehicle comprising:
a surrounding environment information acquiring device configured to acquire surrounding environment information relating to surrounding environmental conditions of the vehicle;
a vehicle information acquiring device configured to acquire vehicle information relating to conditions of the vehicle;
a driver information acquiring device configured to acquire driver information relating to current conditions of a driver of the vehicle; and
an automated driving control part configured to automatically perform driver assistance operations for which the driver has given permission among a plurality of driver assistance operations,
wherein the plurality of driver assistance operations comprises autonomous driving functions, visibility assistance functions, and congestion assistance functions,
wherein the automated driving control part comprises:
a package determining part configured to, based upon a determination that a current driving mode of the vehicle is an automated driving mode, use at least one of the surrounding environment information, the vehicle information, or the driver information to determine a driver assistance package including permissions and non-permissions for the plurality of driver assistance operations; and
a package proposing part configured, based upon a determination that the driver assistance package differs from a currently selected driver assistance package, to propose to the driver to switch to the driver assistance package so as to obtain permissions for the driver assistance operations permitted in the driver assistance package.

2. The control system for a vehicle according to claim 1, wherein
the automated driving control part further comprises a judging part configured to judge whether switching to the driver assistance package proposed by the package proposing part has been authorized by the driver, and
the automated driving control part automatically performs the driver assistance operations according to a result of judgment of the judging part.

3. The control system for a vehicle according to claim 2, wherein
the automated driving control part is further configured to automatically perform the driver assistance operations permitted in the driver assistance package when the judging part judges that switching to the driver assistance package has been authorized by the driver.

4. The control system for a vehicle according to claim 1, wherein
the package proposing part is further configured to propose to the driver to switch to the driver assistance package by a mode whereby the driver can switch to the driver assistance package by a single operation.

5. The control system for a vehicle according to claim 1, wherein the plurality of driver assistance operations comprises a plurality of autonomous driving functions.

6. A control system for a vehicle comprising:
a first sensor configured to acquire surrounding environment information relating to surrounding environmental conditions;
a second sensor configured to acquire vehicle information relating to conditions of the vehicle;
a third sensor configured to acquire driver information relating to current conditions of a driver of the vehicle; and
a processor configured to automatically perform driver assistance operations for which the driver has given permission among a plurality of driver assistance operations,
wherein the plurality of driver assistance operations comprises autonomous driving functions, visibility assistance functions, and congestion assistance functions,
wherein the processor is configured to:
determine whether a current driving mode of the vehicle is an automated driving mode,
based upon the determination that the current driving mode of the vehicle is the automated driving mode, use at least one of the surrounding environment information, the vehicle information, or the driver information, to determine a driver assistance package including permissions and non-permissions for the plurality of driver assistance operations;
determine whether the driver assistance package differs from a currently selected driver assistance package; and
based upon a determination that the driver assistance package differs from the currently selected driver assistance package, control a human-machine interface to communicate to the driver an option to switch to the driver assistance package so as to obtain permissions for the driver assistance operations permitted in the driver assistance package.

7. The control system for a vehicle according to claim 6, wherein the human-machine interface comprises a display.

8. The control system for a vehicle according to claim 6, wherein the human-machine interface comprises a speaker.

9. The control system for a vehicle according to claim 6, wherein the plurality of driver assistance operations comprises a plurality of autonomous driving functions.

10. The control system for a vehicle according to claim 1, wherein the driver assistance package packages together in advance the permissions and non-permissions of the individual driver assistance operations.

11. The control system for a vehicle according to claim 6, wherein the driver assistance package packages together in advance the permissions and non-permissions of the individual driver assistance operations.

* * * * *